United States Patent [19]

Utsunomiya

[11] Patent Number: 5,700,567

[45] Date of Patent: Dec. 23, 1997

[54] MAGNETO-OPTICAL RECORDING MEDIUM

[75] Inventor: Hajime Utsunomiya, Nagano, Japan

[73] Assignee: TDK Corporation, Tokyo, Japan

[21] Appl. No.: 558,419

[22] Filed: Nov. 16, 1995

Related U.S. Application Data

[63] Continuation of Ser. No. 847,702, Mar. 9, 1992, abandoned.

[30] Foreign Application Priority Data

Mar. 14, 1991 [JP] Japan .................. 3-104975
Jan. 30, 1992 [JP] Japan .................. 4-040277

[51] Int. Cl.⁶ .................................................. G11B 5/66
[52] U.S. Cl. .................. 428/332; 428/336; 428/694 NF; 428/694 XS; 428/694 RL; 428/694 ML; 428/900; 369/13; 365/122
[58] Field of Search ............... 428/694 NF, 694 ML, 428/694 XS, 694 RL, 900, 332, 336; 369/13; 365/122

[56] References Cited

U.S. PATENT DOCUMENTS

| | | | |
|---|---|---|---|
| 4,680,742 | 7/1987 | Yamada et al. | 369/13 |
| 4,717,628 | 1/1988 | Takahashi | 428/457 |
| 4,839,883 | 6/1989 | Nagata et al. | 369/286 |
| 4,861,656 | 8/1989 | Uchiyama et al. | 428/333 |

FOREIGN PATENT DOCUMENTS

| | | |
|---|---|---|
| 0045183 | 2/1982 | European Pat. Off. . |
| 0161807 | 11/1985 | European Pat. Off. . |
| 0192256 | 8/1986 | European Pat. Off. . |
| 0331737A1 | 2/1989 | European Pat. Off. . |

OTHER PUBLICATIONS

MagentoOptical Recording Medium; Appl'n No. 64-114459; published 8 May 1989.
Optical Recording Medium; Appl'n No. 64-104576; published 26 Apr. 1989.

Primary Examiner—Leszek Kiliman
Attorney, Agent, or Firm—Watson Cole Stevens Davis, PLLC

[57] ABSTRACT

In a magneto-optical recording medium comprising a first dielectric layer, a recording layer, a second dielectric layer, and a metal reflective layer stacked on a substrate, the second dielectric layer is formed of a mixture of a rare earth element oxide, silicon oxide, and silicon nitride. The medium has increased recording sensitivity and provides stable recording/reproducing performance with low error rate and high resolution.

9 Claims, 1 Drawing Sheet

MAGNETO-OPTICAL RECORDING MEDIUM

This application is a continuation application of application Ser. No. 07/847,702, filed 9 Mar. 1992, now abandoned.

BACKGROUND OF THE INVENTION

Among optical recording media, magneto-optical recording media characterized by large information capacity have marked a noticeable advance. The magneto-optical recording media have a recording layer in the form of a magnetic film deposited on a transparent substrate through a dielectric layer. Recently, an attempt is made to provide a second dielectric layer on the recording layer such that the recording layer is interposed between a pair of dielectric layers and to provide a metal reflective layer on top of the laminate structure for increasing the output of playback signals.

Al and Al alloys are considered useful for the metal reflective layer from the standpoints of light reflectivity and cost. For example, U.S. Pat. No. 4,717,628 discloses an Al-Ni alloy containing 2 to 10 atom % of Ni which is excellent in recording sensitivity and reproducing C/N. Japanese Patent Application Kokai (JP-A) No. 292753/1990 discloses Al-Ta alloys, JP-A 285533/1990 discloses alloys of Al or the like with Re, and JP-A 267752/1990 discloses Al-Nb alloys.

Where such a metal reflective layer is stacked, the second dielectric layer interposed between the recording layer and the metal reflective layer is generally formed of nitrides such as silicon nitride and aluminum nitride. Among these nitrides, silicon nitride having an index of refraction of about 2 provides good enhancement effect when deposited under the metal reflective layer. However, both the metal reflective layer and the second dielectric layer of nitride have enough thermal conductivity to allow heat to dissipate from the recording layer, resulting in low recording sensitivity, especially low recording power threshold (Pth) at the onset of recording, which means inability to record with low recording power.

Optical recording requires not only a low recording power threshold, but also a low error rate in that the minimum recording power (Pmin) providing a byte error rate (BER) of up to $5 \times 10^{-5}$ is low. The prior art laminate structures did not achieve a satisfactory minimum recording power (Pmin).

In general, the resolution between recording signals lowers as the recording power increases. Provided that Pmax is an upper limit of recording power at which the resolution between 3T and 8T signals at a certain rpm is lowered to 40% according to the ISO standard, § 24.1, it is desired that the recording power margin given as (Pmax–Pmin) be as wide as possible. There are many variations in the driving system. The recording laser power varies with a particular unit. Optical and detection systems are subject to variations. An individual operating system contains various variation factors including temperature variations and changes with time of laser power, changes with time of optical and detection systems, variations in tilt angle upon disk loading, scattering by dust, and recording/reproducing conditions. Interchangeability between drive systems of different types is also required. Therefore, in order to ensure stable recording/reproducing operation at all times irrespective of any variation factor in an individual operating system or between operating systems of the same type or between operating systems of different types, the recording power margin should be as wide as possible. Then, the drive system design has a higher degree of freedom and drive control becomes easy. Regretfully, the conventional disks have a rather narrow recording power margin.

SUMMARY OF THE INVENTION

A primary object of the present invention is to widen the recording power margin of a magneto-optical recording medium for improving the recording sensitivity thereof and ensuring stable recording/reproducing performance.

According to the present invention, there is provided a magneto-optical recording medium comprising a first dielectric layer, a recording layer, a second dielectric layer, and a metal reflective layer stacked on a substrate in the described order. The second dielectric layer contains at least one oxide of a rare earth element inclusive of Y, silicon oxide, and silicon nitride. Preferably, the rare earth element is La and/or Ce. The second dielectric layer contains about 5 to 50 mol % of the rare earth element oxide as calculated in stoichiometric composition and has an O/N atom ratio of from about 0.2 to 3. The second dielectric layer is up to about 800 Å thick.

Preferably, the metal reflective layer is selected from the group consisting of aluminum, aluminum base alloys, nickel and nickel base alloys. More preferably, the metal reflective layer is of an aluminum base alloy containing 80 to 99% by weight of Al and up to 20% by weight of Ni. Also, the metal reflective layer is of a nickel base alloy containing a major proportion of Ni and at least one element selected from the group consisting of Co, Cr, W, Mo, and Fe, more preferably containing 35 to 75% by weight of Ni and Co, Cr, Mo, and Fe. The metal reflective layer is about 400 to 1,500 Å thick.

ADVANTAGES

The present invention is successful in significantly improving the recording sensitivity of a magneto-optical recording medium by using a second dielectric layer containing a rare earth element oxide ROx, silicon nitride SiNx, and silicon oxide SiOx. Among recording sensitivity factors, the recording power threshold (Pth) at the onset of recording is lowered. A lowering in recording power threshold (Pth) is believed due to the low thermal conductivity of the second dielectric layer which is effective in confining heat within the underlying recording layer even when the overlying metal reflective layer has a high thermal conductivity.

The present invention is also successful in significantly lowering the minimum recording power (Pmin) providing a byte error rate (BER) of up to $5 \times 10^{-5}$ while ensuring a very wide recording power margin between Pmax, which is an upper limit of recording power providing a resolution of at least 40%, and Pmin.

The inventors proposed the first dielectric layer of a material containing ROx, SiNx, and SiOx as interposed between the substrate and the recording layer in JP-A 161551/1988 and 110843/1990. Since these applications did not take into account the use of a metal reflective layer, significant improvements in sensitivity and recording margin due to the provision of a second dielectric layer of such material under the metal reflective layer are quite unexpected.

DESCRIPTION OF THE PREFERRED EMBODIMENT

Figure 1:
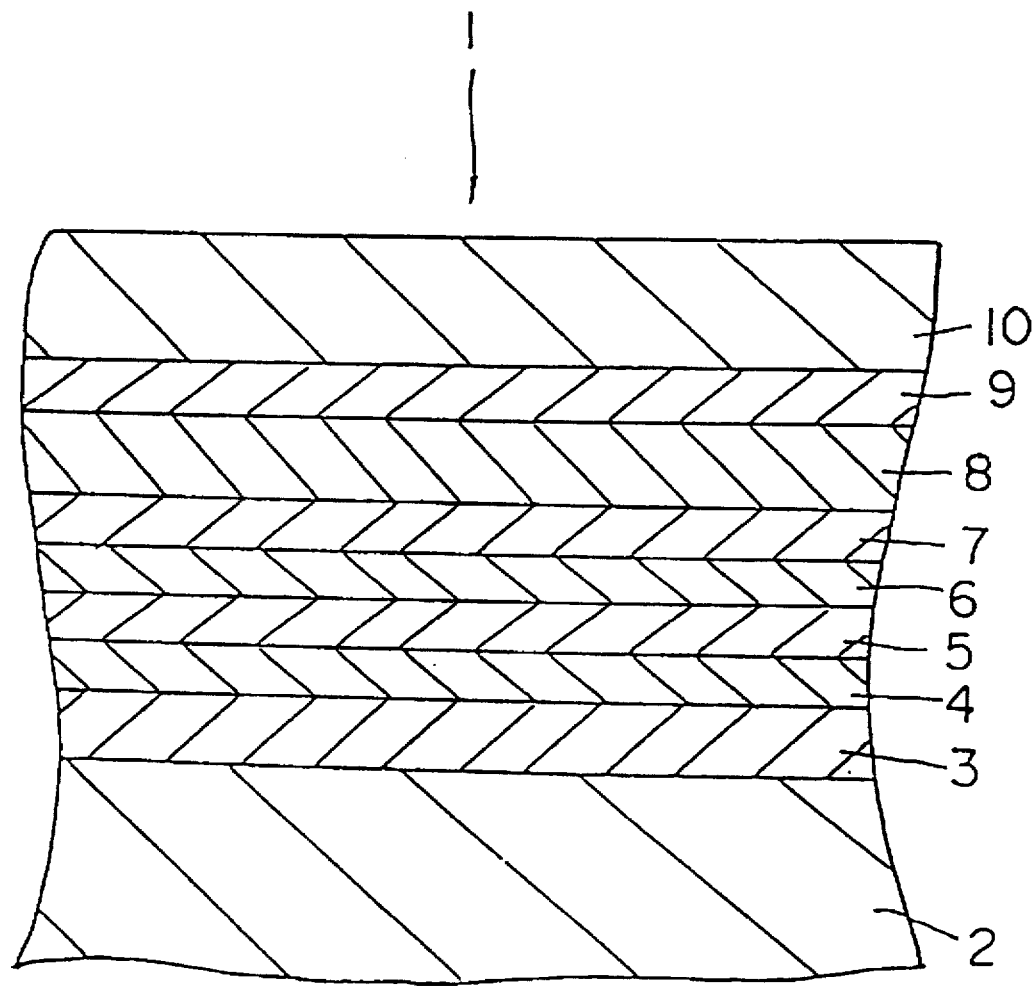
FIG. 1 is a schematic cross section of a magneto-optical recording medium according to one embodiment of the present invention.

Referring to FIG. 1, a magneto-optical recording medium 1 according to one preferred embodiment of the present invention is illustrated as including a protective layer 3, a first dielectric layer 4, a recording layer 5, a second dielectric layer 6, and a reflective layer 7 stacked on one major surface of a substrate 1 in the described order.

The second dielectric layer 6 is disposed on the recording layer 5 for improving the enhancement effect and corrosion resistance. The second dielectric layer 6 is comprised of at least one oxide of a rare earth element (inclusive of Y), silicon oxide, and silicon nitride in order to provide heat accumulation effect and sensitivity improvement therewith and to widen the recording power margin when the metal reflective layer 7 is disposed thereon.

The rare earth elements include Y, La through Sm, and Eu through Ln, alone or in admixture of two or more. Preferably, lanthanides inclusive of Y, especially at least one of La and Ce are contained. Typical oxides of La and Ce are $La_2O_3$ and $CeO_2$. They are of stoichiometric composition although some deviation therefrom is acceptable. Where La and/or Ce are contained, either one or both of La and Ce oxides may be present. Where both La and Ce oxides are contained, their mix ratio is not limited. In addition to the oxide of La and/or Ce, an oxide of another rare earth element such as Y and Er may be contained in an amount of up to about 10 atom % (calculated as metal) based on the total rare earth element oxides. Further, oxides of Fe, Mg, Ca, St, Ba, and Al may be contained, preferably up to 10 atom % for Fe and up to 10 atom % for the total of the remaining elements.

The second dielectric layer contains silicon oxide and silicon nitride in addition to the rare earth element oxide. Typically, silicon oxide and silicon nitride are present in the form of $SiO_2$, $SiO$ and $Si_3N_4$. Some deviation from the stoichiometric composition is acceptable.

Preferably, the second dielectric layer of the above-mentioned composition has an index of refraction of about 1.8 to 3.0, more preferably from about 1.8 to 2.5 at a wavelength of 600 to 900 nm. An index of refraction of lower than 1.8 would lead to a low Kerr rotation angle effect and hence, low outputs whereas an index of refraction of higher than 3.0 would result in low outputs and increased noise.

The second dielectric layer preferably contains rare earth element oxide(s) and silicon compounds in such a ratio that the molar ratio of the total of rare earth element oxides to the total of silicon compounds and rare earth element oxides, calculated as stoichiometric composition, may range from about 0.05 to 0.5. In other words, the second dielectric layer preferably contains about 5 to 50 mol % of rare earth element oxide(s). If this ratio is below the lower limit, there result low outputs and poor durability in a hot humid environment. If this ratio is above the upper limit, there result increased noise and poor durability in a hot humid environment. The atomic ratio of rare earth element/Si ranges from about 0.03 to 0.6. The atomic ratio of O/N ranges from about 0.2 to 3. A lower O/N ratio would detract from durability in a hot humid environment whereas a higher O/N ratio would result in low outputs and degradation with time.

For the measurement of these atomic ratios, conventional analysis such as Auger spectroscopy and EDA may be used. The second dielectric layer may have a graded concentration of oxygen and nitrogen in a thickness direction.

The second dielectric layer is preferably formed by sputtering. The target used in sputtering is a sintered body of a mixture of a rare earth element oxide, preferably $La_2O_3$ and/or $CeO_2$, $SiO_2$, and $Si_3N_4$. Part or all of the rare earth element oxide, preferably $La_2O_3$ and $CeO_2$, may be replaced by pyrophoric alloy such as Auer Metal, Hueber Metal, Misch Metal, and Welsbach Metal.

Like sputtering, other gas phase deposition methods such as CVD, evaporation, and ion plating may be used. In the dielectric layer, Ar and $N_2$ in the deposition atmosphere are often introduced as impurities. Also inclusion of Fe, Ni, Cr, Cu, Mn, Mg, Ca, Na and K as impurities is acceptable.

The second dielectric layer is preferably up to about 800 Å, more preferably about 50 to 600 Å, most preferably about 50 to 500 Å thick. It is desired that the second dielectric layer be thin for increasing light transmittance and outputs. A choice of a low thermal conductivity material for the overlying reflective layer allows the second dielectric layer to be further reduced in thickness. With respect to the thickness of the second dielectric layer, noise would increase if it is too thin whereas outputs and C/N would be low if it is too thick.

The second dielectric layer of the above-mentioned nature has minimal internal stresses and is fully durable upon thermal cycling and effective for protecting the recording layer.

On the second dielectric layer 6 is disposed the metal reflective layer 7. It may be formed of any well-known metal material, for example, metals such as Au, Ag, Al, Cu, Cr, Ni, Ti and Fe, and alloys thereof. Useful are Al, Ni, Al alloys and Ni alloys. Al alloys and Ni alloys are preferred particularly when combined with the second dielectric layer because desired reflectivity, increased outputs, improved sensitivity, and a wide recording power margin are expectable.

Preferred are Al alloys containing 80 to 99% by weight of Al and the balance of at least one of Ni, V, Mo, Hf, W, Au, Si, Mg, Mn, Cr, Ta, Ti, Re, Zn, In, Pb, P, Sb, Cu, Zr, Nb, and Bi. The Al alloys are more effective in widening the recording power margin as well as increasing C/N and recording sensitivity. Most preferred are Al-Ni alloys consisting essentially of up to 20% by weight, especially 1 to 10% by weight of Ni and the balance of Al.

Nickel alloys are also preferred since they have low thermal conductivity and are more effective in increasing recording sensitivity. Preferred are nickel alloys containing about 35 to 75% by weight of nickel and additionally, at least one element selected from Co, Cr, W, Mo, and Fe. More preferably, the nickel alloys known as Hastelloy contain, in approximate percentage by weight, 35 to 75%, especially 40 to 70% of Ni, 0.1 to 5%, especially 0.5 to 5% of Co, 0.1 to 25%, especially 0.5 to 25% of Cr, 0 to 6% of W, 2 to 30%, especially 5 to 30% of Mo, and 0.1 to 25%, especially 1 to 22% of Fe. In addition to the above-mentioned metal elements, the nickel alloys may contain up to 3% by weight of Cu, Nb, and Ta, up to 2% by weight of Mn, and up to 1% by weight of Si and Ti. The reflective layer of these nickel alloys achieves very high sensitivity when combined with the second dielectric layer. The use of nickel alloys having a low thermal conductivity allows the second dielectric layer to be reduced in thickness thus leading to high outputs, and enables to reduce the thickness of the reflective layer itself.

The reflective layer is preferably about 400 to 1,500 Å, more preferably about 500 to 1,000 Å thick. The metal reflective layer becomes non-effective (output and C/N lowering) if it is too thin, and detracts from sensitivity if it is too thick.

The medium having the reflective layer stacked thereon exhibits a light reflectivity of at least about 15%. The reflective layer as such preferably has an index of refraction (the real part of a complex index of refraction) n of about 1.5 to 3.5 and a coefficient of extinction (the imaginary part of a complex index of refraction) k of about 2.5 to 7.0.

The reflective layer of such an alloy can be formed by sputtering, evaporation or ion plating, preferably by sputtering a target of an alloy having the above-defined composition, typically Hastelloy and Al-Ni alloy.

Below the reflective layer 7 and second dielectric layer 6 is disposed the recording layer 5 in which information is magnetically recorded by means of a modulated thermal beam or a modulated magnetic field and then reproduced through magneto-optical conversion.

The material of the recording layer is not critical insofar as magneto-optical recording is possible. Preferably, an alloy containing a rare earth metal, more preferably a rare earth metal and a transition metal is sputtered, evaporated or ion platted to form an amorphous film, with sputtering recommended. The rare earth metals used herein include Tb, Dy, Nd, Gd, Sm, and Ce, and mixtures thereof. The transition metals include Fe and Co. Preferably the alloy consists essentially of Fe and Co in a total content of 65 to 85 atom % and the balance of a rare earth metal or metals. The preferred recording layer has a composition: TbFeCo, DyTbFeCo, NdDyFeCo, NdGdFeCo, and the like. The recording layer may contain up to 10 atom % of an additional metal or metals selected from Cr, Al, Ti, Pt, Si, Mo, Mn, V, Ni, Cu, Zn, Ge, and Au. Also, the recording layer may contain up to 10 atom % of another rare earth metal or metals selected from Sc, Y, La, Ce, Pt, Pm, Sm, Eu, Ho, Er, Tm, Yb, and Lu. The recording layer generally has a thickness of about 10 to about 1,000 nm.

Below the recording layer 5 is disposed the first dielectric layer 4. The first dielectric layer may have an identical or different composition than the second dielectric layer. Preferably, the first dielectric layer is formed of dielectric materials, for example, oxides, carbides, nitrides, and sulfides such as $SiO_2$, SiO, AlN, $Al_2O_3$, $Si_3N_4$, ZnS, BN, $TiO_2$, and TiN, and mixtures thereof to a thickness of about 500 to 2,000 Å. However, as indicated in the following Examples, the preferred substance for the first dielectric layer is SIN. The deposition method is the same as explained for the second dielectric layer.

Between the substrate 2 and the first dielectric layer 4 is preferably disposed the protective layer 3 which may be formed of glass, for example, borosilicate glass, barium borosilicate glass, and aluminum borosilicate glass, optionally containing $Si_3N_4$. Preferred are glasses of borosilicate, barium borosilicate, and aluminum borosilicate types containing 40 to 80% by weight of $SiO_2$, part of which may be replaced by $Si_3N_4$. The protective layer may be formed by sputtering to a thickness of about 300 to 1,500 Å.

The substrate 2 used herein should be substantially transparent to recording and reproducing light, typically semiconductor laser light having a wavelength of about 600 to 900 nm, often about 700 to 800 nm, most often 780 nm. A light transmittance of at least 80% is preferred. This permits recording/reproducing operation from the rear surface of the substrate.

The substrate is generally formed of a resin which is preferably selected from thermoplastic resins such as polycarbonate resins, acrylic resins and amorphous polyolefin resins. If desired, the substrate may be formed with an oxygen-impermeable coating on its outer surface and outer periphery surface. Further, the substrate on the recording layer-bearing surface may be provided with tracking grooves.

Additionally, a protective coat 8 is preferably provided on the reflective layer 7 as shown in FIG. 1. It may be formed from various resinous materials, typically UV-curable resins to a thickness of about 0.1 to 100 µm. Although the protective coat 8 may be a deposited layer or a preformed sheet, it is preferably formed by coating a composition of a radiation-curable compound (e.g., acrylate) and a photopolymerization sensitizer and curing the coating with radiation.

A protective plate 10 may be disposed on the protective coat 8 through an adhesive layer 9 if necessary. The protective plate 10 may be formed of various resins or inorganic materials such as glass and ceramics. The provision of protective coat 8 and protective plate 10 contributes to further improvements in the durability and corrosion resistance of the magneto-optical recording medium.

Instead of using the protective plate 10, two sets each having a series of layers 3 to 8 on a substrate 2 may be joined together via an adhesive layer such that the recording layers are internally opposed to each other. This results in a medium of the double side recording type in which writing is carried out from the outside surfaces of opposed substrates. The substrate 2 and protective plate 10 on their rear or outside surface are preferably coated with a protective coating, which may be of a similar material to those described for the protective coat 8.

EXAMPLE

Examples of the present invention are given below by way of illustration and not by way of limitation.

Example 1

Polycarbonate was injection molded into a substrate having a diameter of 86 mm and a thickness of 1.2 mm. On the substrate, a first dielectric layer of SiNx (x=1.1) was deposited by RF magnetron sputtering to a thickness of 900 Å. On the first dielectric layer, a recording layer of Tb20Fe74Co6 was deposited by sputtering to a thickness of 200 Å.

On the recording layer, a second dielectric layer consisting of 30 mol % of $La_2O_3$, 20 mol % of $SiO_2$ and 50 mol % of $Si_3N_4$ (designated LaSiON I) was deposited by RF magnetron sputtering. The second dielectric layer had a thickness of 200 Å, an index of refraction of 2.0, and an atomic ratio of rare earth element to silicon (R/Si) of 0.35.

On the second dielectric layer, a reflective layer was deposited by RF magnetron sputtering to a thickness of 800 Å. The reflective layer had a composition consisting of, in % by weight, 2% of Co, 15% of Cr, 4% of W, 16% of Mo, 5% of Fe, up to 1% of Si and Mn, up to 0.05% of C, and the balance of Ni (designated Ni alloy I).

On the reflective layer, a protective coat was formed by applying a UV curable resin containing an oligoester acrylate followed by UV curing to a thickness of 5 µm. In this way, a magneto-optical recording disk sample was completed.

It is to be noted that the coating composition was determined by Auger spectroscopy.

The disk sample was measured for reflectivity, recording sensitivity, and C/N ratio.

(1) Reflectivity

Reflectivity at 830 nm was measured by means of a magneto-optical recording disk tester by irradiating a semiconductor laser beam having a wavelength of 830 nm. The reflectivity was 20.7%.

(2) Recording sensitivity

While rotating the disk at 1,800 rpm and applying a magnetic field of 200 Oe, recording was done on the disk at a radius of 30 mm using a light pulse at 3.7 MHz and a duty ratio of 33%. The power (Pth) at the onset of recording was measured. The result is shown in Table 1.

(3) C/N

C/N was measured under the following conditions.

| | |
|---|---|
| Linear velocity | 1,800 rpm |
| Carrier frequency | 3.7 MHz |
| Resolution | 30 kHz |
| Video band width | 1 kHz |
| Recording power (830 nm) | 6.5 mW |

| Reproducing power (830 nm) | 1.5 mW |

The C/N was 45.7 dB.

The sample was also found to be satisfactorily corrosion resistant.

Comparative Example 1

A magneto-optical recording disk sample was fabricated by the same procedure as in Example 1 except that the second dielectric layer was of SiNx (x=1.1).

Example 2

A magneto-optical recording disk sample was fabricated by the same procedure as in Example 1 except that the first and second dielectric layers had a thickness of 1,100 Å and 500 Å, respectively. The disk had a reflectivity of 19.0%, a C/N ratio of 45.2 dB and good corrosion resistance.

Comparative Example 2

A magneto-optical recording disk sample was fabricated by the same procedure as in Example 2 except that the second dielectric layer was of SiNx (x=1.1).

Example 3

A magneto-optical recording disk sample was fabricated by the same procedure as in Example 1 except that the second dielectric layer consisted of 20 mol % of $La_2O_3$, 20 mol % of $SiO_2$ and 60 mol % of $Si_3N_4$ (designated LaSiON II). The second dielectric layer had an index of refraction of 2.4 and an atomic R/Si ratio of 0.20. The disk had a reflectivity of 20.0%, a C/N ratio of 45.8 dB and good corrosion resistance.

Example 4

A magneto-optical recording disk sample was fabricated by the same procedure as in Example 1 except that the second dielectric layer consisted of 20 mol % of $CeO_2$, 30 mol % of $SiO_2$ and 50 mol % of $Si_3N_4$. The second dielectric layer had an index of refraction of 2.1 and an atomic R/Si ratio of 0.11. The disk had a reflectivity of 20.5%, a C/N ratio of 45.7 dB and good corrosion resistance.

Example 5

A magneto-optical recording disk sample was fabricated by the same procedure as in Example 1 except that instead of Ni alloy I, the reflective layer was formed of a composition consisting of, in % by weight, 2% of Co, 22% of Cr, 0.5% of W, 6% of Mo, 20% of Fe, 2% of Cu, 1% of Mn, 2% of Nb and Ta, 0.5% of Si, 0.01% of C, and the balance of Ni (designated Ni alloy II). The disk had a reflectivity of 18.2%, a C/N ratio of 45.2 dB and good corrosion resistance.

Example 6

A magneto-optical recording disk sample was fabricated by the same procedure as in Example 1 except that the metal reflective layer was formed of an Al-Ni alloy consisting of 6% by weight of Ni and the balance of Al. The disk had a reflectivity of 20.9%, a C/N ratio of 47.0 dB and good corrosion resistance.

Example 7

A magneto-optical recording disk sample was fabricated by the same procedure as in Example 6 except that instead of LaSiON I, the second dielectric layer was formed of a composition consisting of 20 mol % of $La_2O_3$, 30 mol % of $SiO_2$ and 50 mol % of $Si_3N_4$ (designated LaSiON III). The second dielectric layer had a thickness of 200 Å, an index of refraction of 2.0, and an atomic R/Si ratio of 0.22. The disk had a reflectivity of 21.0%, a C/N ratio of 47.0 dB and good corrosion resistance.

Example 8

A magneto-optical recording disk sample was fabricated by the same procedure as in Example 4 except that the metal reflective layer was formed of the Al-Ni alloy of Example 6. The disk had a reflectivity of 20.7%, a C/N ratio of 47.0 dB and good corrosion resistance.

Comparative Example 3

A magneto-optical recording disk sample was fabricated by the same procedure as in Example 6 except that the second dielectric layer was of SiNx (x=1.1).

Example 9

A magneto-optical recording disk sample was fabricated by the same procedure as in Example 6 except that the second dielectric layer had a thickness of 500 Å. The disk had a reflectivity of 19.0%, a C/N ratio of 46.5 dB and good corrosion resistance.

Comparative Example 4

A magneto-optical recording disk sample was fabricated by the same procedure as in Example 9 except that the second dielectric layer was of SiNx (x=1.1).

The recording sensitivity measurements of Examples are shown in Table 1.

TABLE 1

| Example | Second dielectric layer Composition | Thickness (Å) | Reflective layer | Sensitivity Pth (mW) |
|---|---|---|---|---|
| E1 | LaSiON I | 200 | Ni alloy I | 2.3 |
| CE1 | SiNx | 200 | Ni alloy I | 3.2 |
| E2 | LaSiON I | 500 | Ni alloy I | 1.5 |
| CE2 | SiNx | 500 | Ni alloy I | 2.3 |
| E3 | LaSiON II | 200 | Ni alloy I | 2.6 |
| E4 | CeSiON | 200 | Ni alloy I | 2.3 |
| E5 | LaSiON I | 500 | Ni alloy II | 1.5 |
| E6 | LaSiON I | 200 | Al—Ni | 3.6 |
| E7 | LaSiON III | 200 | Al—Ni | 3.6 |
| E8 | CeSiON | 200 | Al—Ni | 3.6 |
| CE3 | SiNx | 200 | Al—Ni | 4.5 |
| E9 | LaSiON I | 500 | Al—Ni | 2.8 |
| CE4 | SiNx | 500 | Al—Ni | 3.6 |

As seen from Table 1, the disk samples of Examples show significantly higher sensitivity (Pth) than the comparative samples.

Next, the disk samples were examined for the minimum recording power and recording power margin.

(4) Minimum recording power (Pmin)

The byte error rate (BER) was measured under the following conditions.

Disk rotation: 1800, 2400, 3600 rpm
Recording signal: B3 pattern
Measurement site: 0 to 300 tracks
Recording magnetic field: 200 Oe
Laser wavelength: 780 nm While the recording power was increased from 1.5 mW, the minimum recording power Pmin (mW) at which BER was reduced to below $5.0 \times 10^{-5}$ was measured.

(5) Recording power margin
Resolution was measured under the following conditions.

Disk rotation: 1800, 2400, 3600 rpm
Recording signal: 3T, 8T
Measurement site: radius 24 mm
Recording magnetic field: 400 Oe
Laser wavelength: 825 nm While the recording power was increased from 1.5 mW, the maximum recording power Pmax (mW) which maintained a resolution of at least 40% was measured. The recording power margin was (Pmax−Pmin) expressed in mW.

The results are shown in Table 2.

TABLE 2

| Example | Second Dielectric layer Composition | Thickness (Å) | Pth (mW) | 1800 rpm Pmin (mW) | 1800 rpm Margin (mW) | 2400 rpm Pmin (mW) | 2400 rpm Margin (mW) | 3600 rpm Pmin (mW) | 3600 rpm Margin (mW) |
|---|---|---|---|---|---|---|---|---|---|
| E1  | LaSiON I   | 200 | 2.3 | 3.6 | 2.9 | 3.6 | 4.1 | 4.6 | 5.6 |
| CE2 | SiNx       | 500 | 2.3 | 5.2 | 2.0 | 5.2 | 3.2 | 6.2 | 4.5 |
| E6  | LaSiON I   | 200 | 3.6 | 4.9 | 3.4 | 4.9 | 4.6 | 5.9 | 6.1 |
| E7  | LaSiON III | 20D | 3.6 | 4.8 | 3.4 | 4.9 | 4.6 | 6.0 | 6.1 |
| E8  | CeSiON     | 200 | 3.6 | 4.9 | 3.4 | 4.9. | 4.6 | 5.8 | 6.2 |
| CE4 | SiNx       | 500 | 3.6 | 6.5 | 2.5 | 6.5 | 3.7 | 7.5 | 5.0 |

As is evident from Table 2, for a disk structure having the same metal reflective layer and designed to have the same Pth, the use of a second dielectric layer within the scope of the invention allows the dielectric layer be reduced in thickness and achieves a significant lowering of the minimum recording power Pmin at which stable recording with a low error rate (BER$\leq$5.0$\times$10$^{-5}$) and a high resolution ($\geq$40%) is carried out, thus resulting in a wide recording power margin.

There has been described a magneto-optical recording medium including a dielectric layer of a mixture of ROx, SiOx and SiNx between the recording layer and a metal reflective layer whereby the medium has very high recording sensitivity and a wide recording power margin.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

I claim:

1. A magneto-optical recording medium comprising a first dielectric layer, a recording layer, a second dielectric layer, and a metal reflective layer stacked on a substrate in the described order, said second dielectric layer consisting essentially of at least one oxide of La and Ce, silicon oxide and silicon nitride, said first dielectric layer consisting essentially of silicon nitride, and said metal reflective layer consisting essentially of an aluminum alloy containing nickel.

2. The magneto-optical recording medium of claim 1 wherein said second dielectric layer is up to about 800 Å thick.

3. The magneto-optical recording medium of claim 1, wherein said second dielectric layer contains about 5 to 50 mol % of the rare earth element oxide as calculated stoichiometrically and has an O/N atom ratio of from about 0.2 to 3.

4. The magneto-optical recording medium of claim 1, wherein said aluminum base alloy contains 80 to 99% by weight of Al.

5. The magneto-optical recording medium of claim 4 wherein said aluminum base alloy contains up to 20% by weight of Ni.

6. The magneto-optical recording medium of claim 1, wherein the minimum recording power at which stable recording with a lower bit error rate of up to 5.0$\times$10$^{-5}$ and a high-resolution of at least 40% is carried out is lowered.

7. The magento-optical recording medium of claim 1, wherein said second dielectric layer is about 50 to 500 Å thick.

8. The magneto-optical recording medium of claim 1, wherein the recording medium has a disk shape and is rotated at 1800 to 3600 rpm for recording and reproducing.

9. The magneto-optical recording medium of claim 1, wherein said metal reflective layer is about 400 to 1,500 Å thick.

* * * * *